April 23, 1957 E. H. HUGENHOLTZ ET AL 2,790,072
TUNABLE TRANSCEIVER
Filed Sept. 25, 1952
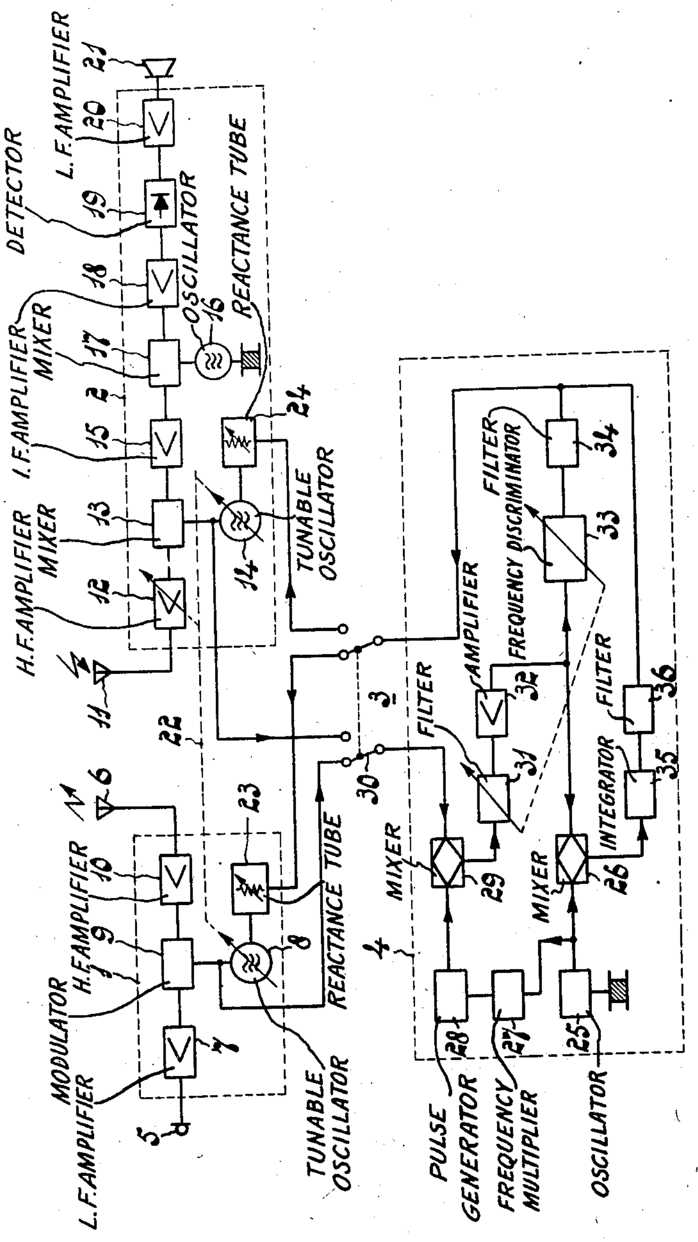
INVENTORS:
EDUARD HERMAN HUGENHOLTZ
MARIUS ROBERT MANTZ 2,790,072

TUNABLE TRANSCEIVER

Eduard Herman Hugenholtz and Marius Robert Mantz, Hilversum, Netherlands, assignors, by mesne assignments, to North American Philips Company, Inc., New York, N. Y., a corporation of Delaware

Application September 25, 1952, Serial No. 311,423

Claims priority, application Netherlands September 27, 1951

2 Claims. (Cl. 250—13)

The present invention relates to a tunable transceiver. More particularly, the invention relates to a transceiver, which is tunable to different communication channels and comprises a transmitter and a receiver to be used alternately, the latter being constructed in the form of a single or a multiple superheterodyne receiver.

Receivers of the aforesaid kind are known, in which the frequency of the transmitter oscillator is stabilized on the tuning frequency of the receiver. The difference between the transmitter oscillator frequency to be used for any communication channel and the associated frequency of the (first) local oscillator of the receiver is chosen, as is common practice to do, to be equal to the (first) intermediate frequency of the receiver. A frequency discriminator is connected to the (first) intermediate-frequency amplifier of the receiver in order to obtain a control-voltage to provide a correction of the transmitter oscillator frequency such that it accurately corresponds to the tuning frequency of the receiver. However, with such transceivers the requirements in regard to stability to be fulfilled by the receiver and, more particularly, by its tunable first local oscillator, give rise to difficulties in practice.

These difficulties may be obviated by providing both the transmitter oscillator and the first local oscillator of the receiver with frequency correctors to be controlled by the control-voltages in order to obtain automatic stabilization of their frequencies with respect to a control-frequency.

According to the present invention a tunable transceiver of the last-mentioned type is materially simplified and hence made more economical by taking the control-voltages to be supplied to the frequency correctors for automatic stabilization of the transmitter oscillator frequency and the frequency of the first local oscillator of the receiver from a control-voltage generator. The control voltage generator is common to the transmitter and the receiver and can be connected at will, by means of a selector switch, to one of the oscillators to be stabilized. The control-voltage generator comprises a pulse mixing stage, which is normally cut off and in which the oscillator voltage to be stabilized is mixed with stabilizing pulses which render the mixing stage periodically conductive, the recurrence frequency of these pulses being $f$, the said intermediate frequency of the receiver being $nf$, $n$ being an integer 1, 2, 3 . . . .

In order that the invention may be more clearly understood and readily carried into effect, it will now be described more fully with reference to the accompanying drawing, in which the single figure is a schematic block diagram of an embodiment of a transceiver according to the present invention.

The transceiver shown comprises a transmitter portion 1, a receiver portion 2, a switch 3 forming part of the transceiving switch and a control-voltage generator or stabilizing unit 4.

The transmitter portion 1 is connected to a microphone 5 and a transmitter aerial 6 and comprises a low-frequency amplifier 7, connected to the microphone 5, through which the modulating oscillations are supplied to a modulator 9, connected to a tunable carrier-wave oscillator 8. The modulated oscillations control a transmitter output amplifier 10, to which the transmitter aerial 6 is connected.

The receiver portion 2 is constructed in the form of a double superheterodyne receiver. The oscillations received through the receiver aerial 11 are supplied to a mixing stage 13 via a tunable high-frequency preamplifier 12, the mixing stage 13 being connected to a tunable first local oscillator 14. The intermediate frequency oscillations taken from the mixing stage 13 are supplied through a first intermediate-frequency amplifier 15 to a second mixing stage 17, connected to a crystal-controlled second local oscillator 16, having fixed tuning, in order to produce oscillations to be amplified in a second intermediate-frequency amplifier 18. A detector 19, connected to the second intermediate-frequency amplifier 18, produces demodulated oscillations which are supplied through a low-frequency amplifier 20 to a loudspeaker 21.

The tuning members of the transmitter and the receiver are preferably coupled mechanically as is shown diagrammatically in the figure by a broken line 22.

The transmitter portion 1 and the receiver portion 2 are tunable in a range of, for example, 20 to 40 megacycles per second, in coarse steps to multiples of 1 megacycle per second and in fine steps to multiples of 0.1 megacycle per second. Tuning to multiples of 0.5 megacycle per second is for the sake of simplicity left out of consideration hereinafter, since in connection with the numerical example presented this would give rise to complications which are not essential for a good understanding of the present invention and which therefore need not be explained.

The transceiver is tuned to a desired communication channel by tuning the transmitter oscillator 8 and the first local oscillator 14 of the receiver to the required frequencies with an accuracy of about 20 to 80 kilocycles per second, for example, with the use of a pawl locking mechanism, after which automatic correction and stabilization of the oscillator frequencies occurs by means of frequency correctors 23 and 24 which may comprise, for example, reactance tubes. The frequency correctors 23 and 24 are controlled by the control-voltage supplied by the control-voltage generator 4. A difference corresponding to the first intermediate-frequency of the receiver of for example, 4 megacycles per second, prevails between the tuning frequencies of the transmitter oscillator 8 and the first local oscillator 14 of the receiver. If, for example, the transmitter oscillator frequency is 26.8 megacycles per second, the first local oscillator 14 must supply a frequency of $26.8-4=22.8$ megacycles per second.

Irrespective of the choice of the communication channel in the given range of 20 to 40 megacycles per second the transmitter oscillator 8 and the first local oscillator 14 are stabilized with respect to a control-frequency by the same control-voltage generator 4, which is of a known type (cf. U. S. Patent 2,574,482, issued November 13, 1951, to Hugenholtz and which operates as follows.

A crystal-controlled oscillator 25 supplies short pulses (duty-cycle, for example, at the most 1/50) having a recurrence frequency of 0.1 megacycle per second; these pulses each time release for short periods a pulse mixing stage 26, which is normally cut off, and also are fed to a frequency multiplier 27 in order to produce a sine wave oscillation of 0.5 megacycle per second. The output oscillation of the multiplier 27 synchronizes a pulse generator 28, which supplies short pulses (duty-cycle, for example, 1/30) having a recurrence frequency of 1 megacycle per second, these pulses each time releasing for short periods a second pulse mixing stage 29, which is normally cut off.

In the position of the selector switch 3 shown and through contacts 30 thereof the transmitter oscillator frequency of, for example, about 26.8 megacycles per second, to be stabilized, is supplied to the pulse mixing stage 29. The mixing of this frequency with the 25 megacycles per second harmonic of the 1 megacycle per second pulses generates a beat frequency of about 1.8 megacycles per second, which is separated from other beat frequencies produced in the mixing stage by a selective filter 31 and which is supplied to an amplifier 32. In the embodiment described the filter 31 is tunable between 1.1 and 1.9 megacycles per second in steps of 0.1 megacycle per second; however, it is not tunable to 1.5 megacycles per second. It should be noted here that the tunable selective filter 31 may be replaced by a fixedly tuned bandpass filter, if the output circuit of the pulse mixing stage 29 need only transmit beat frequencies of 1.5 to 1.9 megacycles per second.

The beat frequency of about 1.8 megacycles per second taken from the amplifier 32 is supplied to a frequency discriminator 33, preferably of the bandpass filter type, and to the pulse mixing stage 26, operating as a phase discriminator (phase detector); these two discriminators are of a known type and provide a coarse control and a fine control respectively, of the frequency to be stabilized.

Together with the filter 31, the frequency discriminator 33 may be tuned in the range from 1.1 to 1.9 megacycles per second in steps of 0.1 megacycle per second (with the exception of 1.5 megacycles per second) and supplies a D. C. control-voltage, through a smoothing filter 34, to the frequency corrector 23 of the transmitter oscillator 8. This D. C. voltage is positive or negative in accordance with whether the beat frequency supplied thereto (and hence the frequency of the transmitter oscillator 8 to be corrected) is higher or lower than the desired frequency, in the present case 1.8 megacycles per second. As is known, a frequency discriminator supplies a control-voltage only if there is a certain frequency divergence, so that it cannot reduce frequency divergences to zero. In order to obtain this reduction provision is made of the phase discriminator 26, to which stabilizing pulses having a recurrence frequency of 0.1 megacycle per second are supplied. This phase discriminator becomes automatically operative or else it "catches" as soon as the frequency difference between the beat frequency (in the present case about 1.8 megacycles per second) applied and a harmonic of the control-pulses (in the present case the 1.8 mc./s. harmonic) becomes lower than the catching frequency range of, for example, 0.5 to 5 kilocycles per second. Then the output voltage of the pulse mixing stage 26 is supplied through a network 35, integrating the output pulses and a low pass filter 36, together with the output voltage of the smoothing filter 34, to the frequency corrector 23 of the transmitter oscillator 8. The output voltage produces locking of the frequencies compared by means of a D. C. control-voltage varying with the phase relationship of the voltages compared (in the present case 1.8 megacycles per second beat frequency and the 1.8 megacycles per second harmonic of the 0.1 megacycle per second stabilizing pulses). The frequency of the stabilized oscillator 8 is then held accurately at the desired frequency of 26.8 megacycles per second, i. e. at the sum of the frequencies of the 25 megacycles per second harmonic of the 1 megacycle per second stabilizing pulses, supplied to the pulse mixing stage 29 and the 1.8 megacycles per second harmonic of the 0.1 megacycle per second stabilizing pulses supplied to the pulse mixing stage 26.

If the transceiver, as is assumed above, is tuned to 26.8 megacycles per second, the first local oscillator 14 of the receiver is tuned to about 22.8 megacycles per second. If the receiver becomes operative, by operating the transceiving switch, and hence, by reversing the switch 3, the control-voltage generator 4 is connected to the first local oscillator 14 of the receiver and the associated frequency corrector 24. The local receiver oscillator voltage of about 22.8 megacycles per second is supplied to the pulse mixing stage 29. Upon mixing with the 21.0 megacycles per second harmonic of the 1 megacycle per second pulses supplied to the pulse mixing stage 29, the mixing stage 29 supplies a beat frequency of 1.8 megacycles per second, which also occurs when the transmitter is operative and which now stabilizes the local oscillator 14 at 22.8 megacycles per second in the same manner as described above, but now by means of the frequency corrector 24. Consequently, when changing from transmitting to receiving, nothing need be changed in the control-voltage generator 4, since with a given adjustment of the control-voltage generator the latter is suitable not only for the stabilization of a single frequency, but also for the stabilization of frequencies which diverge therefrom by a whole multiple ($n$) of the recurrence frequency ($f$) of the stabilizing pulse supplied to the pulse mixing stage 29. The difference between the transmitter oscillator frequency and the frequency of the first local oscillator of the receiver corresponds to the first intermediate frequency of the receiver and must, in connection with what has been stated, be a whole multiple of the said pulse recurrence frequency, i. e., $nf$, in order to permit the use of the control-voltage generator 4 both for the stabilization of the transmitter and of the receiver, without modification of said generator.

The condition described with respect to the use of the control-voltage generator 4 for the transmitter and the receiver remains unchanged, if the transceiver is tuned to a communication channel different from that of 26.8 megacycles per second mentioned above. If the desired communication frequency is, for example, 24.3 megacycles per second the transmitter oscillator 8 and the receiver oscillator 14 are tuned to about 24.3 megacycles per second and 20.3 megacycles per second, respectively, and the filter 31 and the frequency discriminator 33 are tuned to 1.3 megacycles per second. Together with the 23 mc./s. and the 19 mc./s. harmonics of the 1 megacycle per second stabilizing pulses these oscillator frequencies generate, in the pulse mixing stage 29, a beat frequency of about 1.3 megacycles per second. The frequency discriminator 33, tuned to this frequency, then produces a control-voltage for coarse control of the frequency of the operative oscillator 8 or 14 and the comparison of the 1.3 megacycles per second beat frequency with the 1.3 megacycles per second harmonic of the 0.1 megacycle per second stabilizing pulses in the pulse mixing stage 26 furnishes a control-voltage for fine control of the frequency of the operative oscillator 8 or 14 at 24.3 megacycles per second or 20.3 megacycles per second, respectively.

In the embodiment described the oscillators 8 and 14 are stabilized at frequencies lying between harmonics of the 1 megacycle per second stabilizing pulses. If such interpolation of frequencies is not required, it may suffice to use the pulse mixing stage 29, which is then to be used in the control-voltage generator as a phase discriminator. The required control-voltage may be taken from the stage 29 through an integrating network and a low pass filter, provided that, taking the restricted catching range of such a control-voltage generator into consideration, the tuning accuracy of the oscillators 8 and 14 is chosen to be sufficiently great.

In the said control-voltage generator the pulse generator 28 and the pulse mixing stage 29, or the pulse generator 25 and the pulse mixing stage 26, may be united by providing the pulse mixing stage 29 or 26 with a special tube, i. e. a cathode-ray tube. From the generator 28 or 25 may then be taken a preferably sinusoidal voltage of 1 megacycle per second or 0.1 megacycle per second, respectively, and used for deflection of the electron beam in the cathode-ray tube such that during each period of the deflection voltage, the beam strikes once a strip-shaped collecting electrode. Then the collecting electrode carries current pulses having a pulse recurrence frequency of 1 megacycle per second or 0.1 megacycle per second, respectively. By supplying the oscillator voltage or the beat frequency to be corrected to an intensity-control electrode of the cathode-ray tube, the current pulses carried by the collecting electrode are modulated by the oscillator voltage or the beat voltage respectively, as is the case in the embodiment described in the pulse mixing stage 29 or 26, respectively. For detailed constructions of pulse mixing stages constructed in the form of cathode-ray tubes reference is made to U. S. Patent application, Serial No. 149,692, filed March 15, 1950, now Patent No. 2,736,803.

While the invention has been described by means of specific examples and in a specific embodiment, we do not wish to be limited thereto, for obvious modifications will occur to those skilled in the art without departing from the spirit and scope of the invention.

What we claim is:

1. A transceiver tunable to different communication channels comprising a superheterodyne receiver having a local oscillator, a transmitter having a transmitter oscillator, each of said oscillators being provided with a frequency corrector, a control voltage generator, and means for selectively connecting said generator to one of said oscillators, said generator comprising a first pulse mixing stage having operating voltages at which said stage is normally cut-off, means for applying stabilizing pulses to said mixing stage to periodically release same, means for applying the output voltage from said one oscillator to said mixing stage to mix therein with said stabilizing pulses, means for deriving a control voltage from said first mixing stage comprising a frequency discriminator and a selective filter coupling said discriminator to said mixing stage to apply a beat frequency from said mixing stage to said discriminator to produce a direct control voltage for coarse frequency correction of said one oscillator, and a second pulse mixing stage operating as a phase discriminator and having operating voltages at which said second stage is normally cut-off, means for applying to said second stage additional stabilizing pulses having a recurrence frequency which is a subharmonic of the recurrence frequency of the stabilizing pulses applied to said first mixing stage, means for applying said beat frequency through said selective filter to said second mixing stage to mix with said additional stabilizing pulses to produce a control voltage for fine control of said one oscillator, and means for applying said control voltage to the frequency corrector of said one oscillator for automatically stabilizing same, the difference between the frequencies of said transmitter oscillator and said local oscillator being *nf*, where *f* is the pulse recurrence frequency and *n* is an integer.

2. A transceiver tunable to different communication channels comprising a superheterodyne receiver having a local oscillator, a transmitter having a transmitter oscillator, each of said oscillators being provided with a frequency corrector, a control voltage generator, and means for selectively connecting said generator to one of said oscillators, said generator comprising a first pulse mixing stage having operating voltages at which said stage is normally cut-off, means for applying stabilizing pulses to said mixing stage to periodically release same, means for selectively applying the output voltage from said oscillators to said mixing stage to mix therein with said stabilizing pulses thereby to produce a control voltage having a difference frequency as determined by the frequpency of the oscillator selectively connected to said mixing stage and a harmonic multiple of the pulse recurrence frequency of said stabilizing pulses, a filter coupled to said mixing stage and having different given transmission frequencies at the said different communication channels, and means for selectively applying said control voltage through said filter to the frequency corrector of a selected one of said oscillators for automatically stabilizing same, the difference between the frequencies of said transmitter oscillator and said local oscillator being *nf*, where *f* is the pulse recurrence frequency and *n* is an integer whereby the output voltages produced by said mixing stage upon selective connection of said oscillators to said mixing stage have the same difference frequency.

References Cited in the file of this patent

UNITED STATES PATENTS

| | | |
|---|---|---|
| 2,452,601 | Ranger | Nov. 2, 1948 |
| 2,460,781 | Cantelo | Feb. 1, 1949 |
| 2,477,039 | Braak | June 26, 1949 |
| 2,505,670 | Gross et al. | Apr. 25, 1950 |
| 2,528,632 | Woodworth et al. | Nov. 7, 1950 |
| 2,617,985 | Collins | Nov. 11, 1952 |
| 2,662,180 | Hugenholtz | Dec. 8, 1953 |